United States Patent [19]

Adams

[11] 3,770,301
[45] Nov. 6, 1973

[54] REPAIR FLANGE CLAMP
[76] Inventor: Harold R. Adams, R.R. 1, St. Francisville, Ill. 62460
[22] Filed: May 8, 1972
[21] Appl. No.: 251,174

[52] U.S. Cl.................... 285/15, 222/390, 285/294, 285/363
[51] Int. Cl............................................. F16l 55/10
[58] Field of Search...................... 285/294, 297, 96, 285/373, 97, 94, 15, 363; 184/105 A; 222/390; 138/97, 99

[56] References Cited
UNITED STATES PATENTS
1,377,023  5/1921  Nelson............................ 184/105 A
1,679,511  8/1928  Ward.................................. 222/390

Primary Examiner—Thomas F. Callaghan
Attorney—Glenn K. Robbins

[57] ABSTRACT

A flange clamp assembly encircling pipe flanges for sealing all leakage at the flange joint and a gun for forcing sealant compound into the clamp. The clamp is in the form of a split ring adapted to encircle and be clamped against mating pipe flange fittings to cover the joint therebetween. The clamp is provided with a cavity in the form of a shallow annular groove in the inside of the clamp fitting over the joint and connected to an inlet sealant fitting for forcing sealant therethrough. The inlet fitting is bifurcated in the form of a Tee-fitting with a threaded inlet receiving a sealant gun. A bolt valve is adapted to pass through another opening of the Tee-fitting and open and close the sealant inlet. The sealant gun has an injector housing with an advancing screw adapted to be gripped by a wrench to force sealant through a threaded nozzel into the fitting. As a modification, the flange clamp may comprise three axially aligned rings to accommodate flanges of slightly different sizes with the middle ring being provided with the sealant cavity.

3 Claims, 11 Drawing Figures

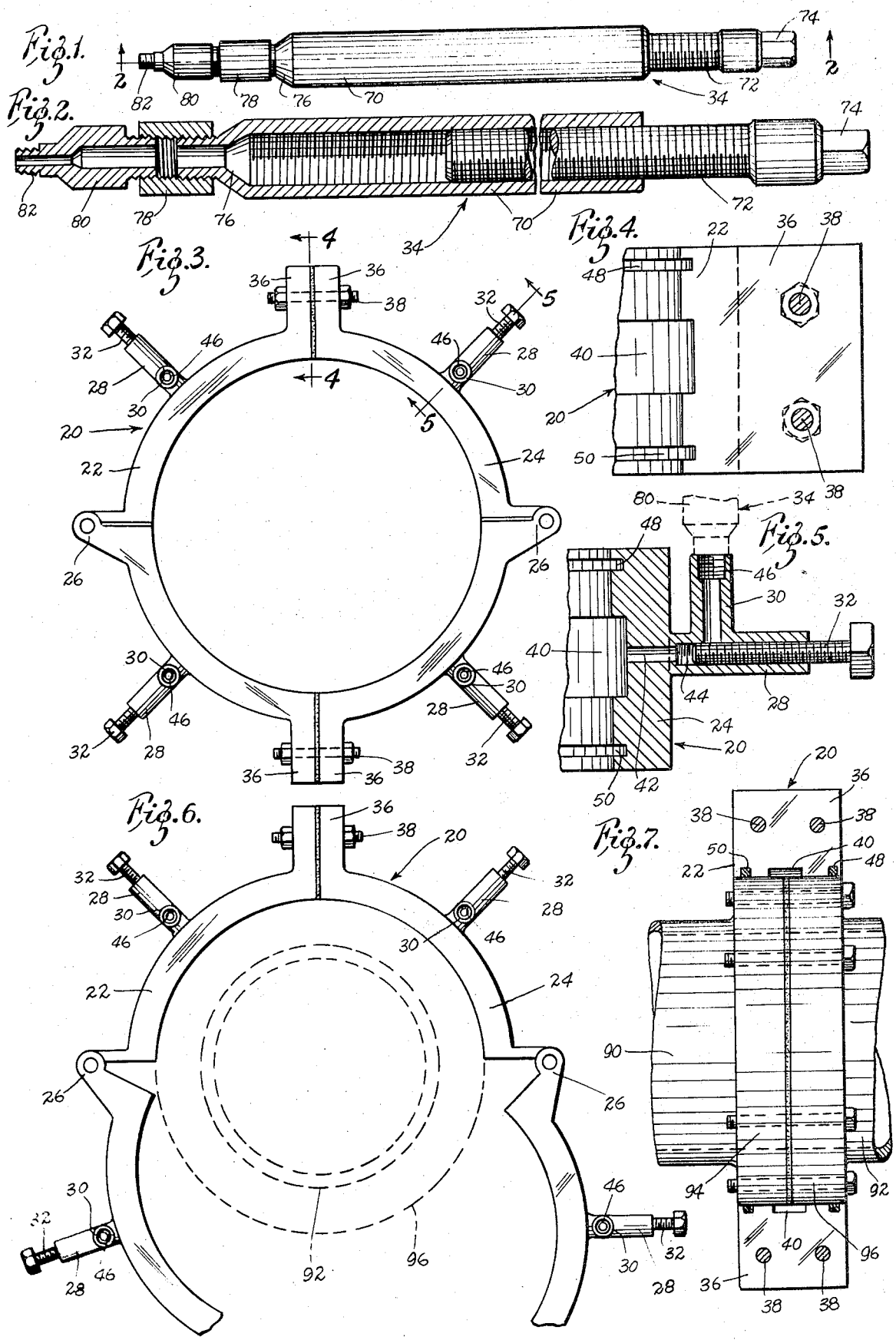

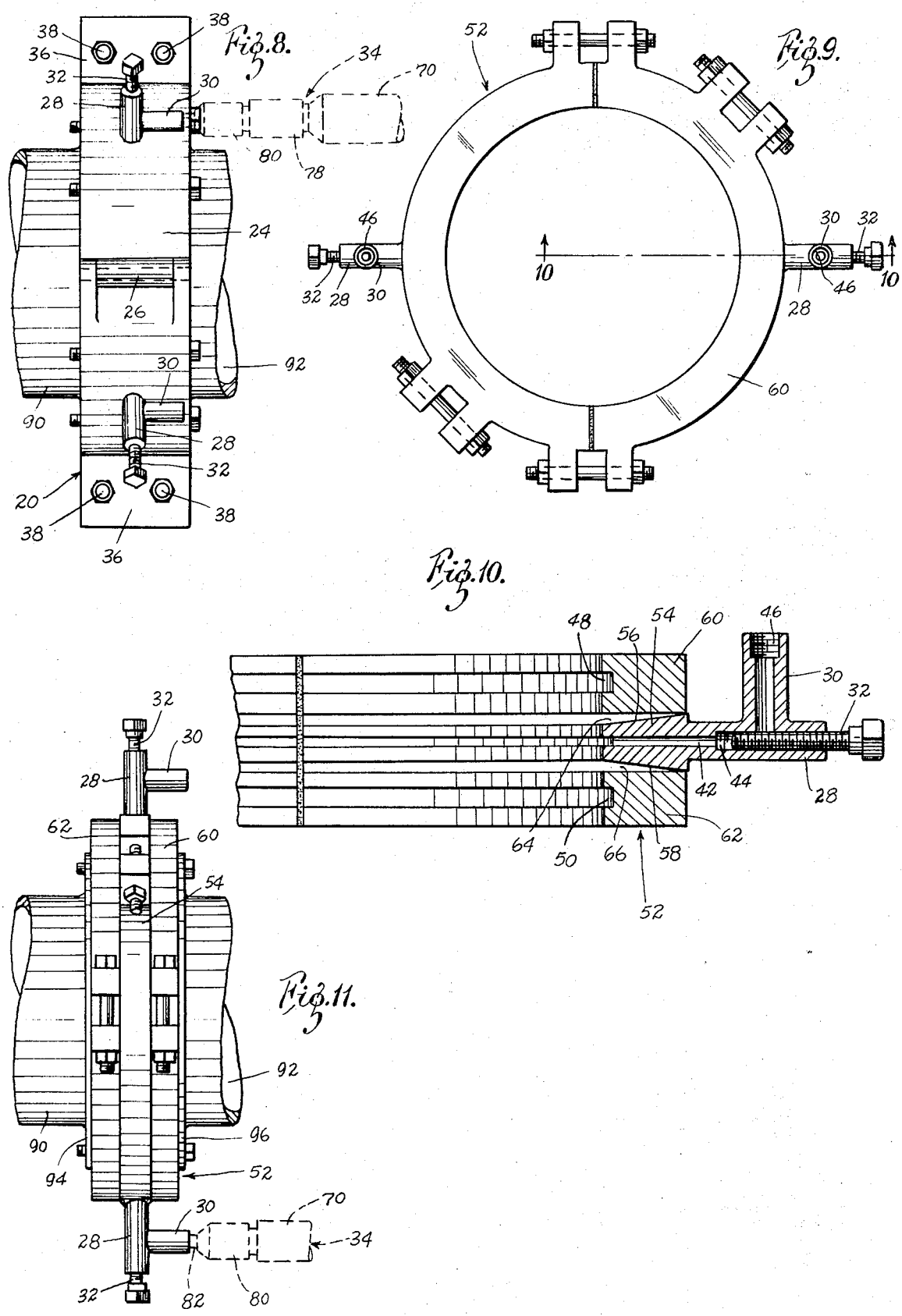

3,770,301

REPAIR FLANGE CLAMP

SUMMARY OF THE INVENTION

In the past, various types of means have been provided to seal pipe flanges. Such means have been relatively complicated and of unpredictable success because of the high pressure or corrosive nature of the fluid within the pipe tending to force the fluid through the sealant.

By means of this invention there has been provided a flange clamp assembly which is adapted to be clamped about a pipe flange with means through a sealant gun for forcing sealant under extremely high pressure around a cavity registering with the joint between the mating pipe flanges. The flange clamp is provided with a specially designed bifurcated fitting in the nature of a Tee-fitting to force sealant therethrough into the cavity in the form of a shallow annular groove on the inner face of the clamp to provide an extremely high pressure of the sealant exceeding the internal pressure within the pipe. Secondary seals are provided by packing seal grooves on either side of the sealant groove.

The special fitting of this invention as described above is in the form of a Tee with one threaded fitting receiving a high pressure sealant gun. A second fitting of the Tee is axially aligned with the inlet into the cavity to receive a valve member which opens and closes communication of the sealant inlet. In the preferred form the valve member is in the shape of a threaded bolt or advancing screw which is advanceable into the threaded fitting to block off or open the sealant inlet. The advancing scale has a polygonal head such as in the form of a hexagon to receive a conventional wrench for applying an extreme amount of pressure.

The sealant gun is in the form of an elongated injector housing which has a threaded nozzle at one end receivable within the threaded sealant inlet. The rear end of the housing receives a threaded advancing screw having a polygonal end adapted to be fitted to a wrench for applying an extreme amount of pressure to force the sealant through the sealant inlet. The advancing screw can be simply removed for charging the injector housing with the sealant material.

As a modification of the flange clamp of this invention, the split ring clamp can be provided in the form of three axially aligned rings. The middle ring is provided with the sealant cavity and Tee-fitting as in the main clamp and is bounded by split ring clamps on each side which can be fitted over a pipe flange fitting where one flange has a slightly different diameter than the other flange of the fitting. By this modification, slight irregularities in the diameter of the pipe flange fittings can be accommodated and a wide range of adaptability in use is provided.

The flange clamp and sealant gun of this invention are simple and rugged in construction and can be used on various types of pipe such as steam and gas pipes, chemical lines and the like and can be fitted by workmen using only a simple wrench without any complicated or expensive tools required.

The above features are objects of this invention and further objects will appear in the detailed description which follows and will be otherwise apparent to those skilled in the art.

For the purpose of illustration of this invention, there is shown in the accompanying drawings a preferred embodiment thereof. It is to be understood that these drawings are for the purpose of illustration only and that the invention is not limited thereto.

IN THE DRAWINGS

FIG. 1 is a view in side elevation of the sealant gun.

FIG. 2 is an enlarged view partially in longitudinal section of the sealant gun.

FIG. 3 is a plan view of a hInged flange clamp for use with the sealant gun.

FIG. 4 is an enlarged view in section taken on the line 4—4 of FIG. 3.

FIG. 5 is an enlarged view in section taken on the line 5—5 of FIG. 3.

FIG. 6 is a view taken similarly to FIG. 3 but showing the expansion of the flange clamp as it is clamped around a flange.

FIG. 7 is a view in side elevation of connected pipe flanges showing one-half the flange clamp attached to the flange fitting by a section taken through the connecting flange bolts.

FIG. 8 is a view in side elevation of the flange clamp attached to a flange fitting wi4h the sea'ant gun shown in dotted lines ready for use.

FIG. 9 is a plan of a modified type of flange clamp.

FIG. 10 is an enlarged view in section taken on the line 10—10 of FIG. 9.

FIG. 11 is a view in side elevation showing the attachment of the modified flange clamp of FIG. 9 on a flange fitting.

DESCRIPTION OF THE INVENTION

The flange clamp of this invention is generally identified by the reference numeral 20 in FIGS. 3 through 8. It is in the form of a split ring collar made in two halves 22 and 24, each of which is provided with a hinge 26. Tee-fittings 28 are provided in a plurality of locations to receive a sealant gun through an inlet fitting 30 and a bolt valve 32. The sealant gun employed to pump the sealant through the sealant inlet is identified by the reference numeral 34 in FIGS. 1 and 2.

The split ring clamps 22 and 24 are identical in construction and each is provided with a pair of flanges 36 at the opposite sides having bolt holes receiving a tightening bolt 38. In this fashion, the flange clamp halves are adapted to be tightened against one another about the pipe flanges as will be further described.

The internal construction of the flange clamps to receive the sealant is best shown in FIGS. 4 and 5. As there shown a central cavity 40 is provided on the interface of the flange clamps in the form of a shallow annular groove completely encircling the flange clamp and adapted to register with the joint provided between the mating pipe flanges to be sealed. The cavity 40 is connected to the fitting through a passage 42 which is in axial alignment with the bolt valve member 32 fitting through a threaded passage 44. The threading in passage 44 extends past the sealant inlet fitting 30 as shown in FIG. 5 in order that the bolt valve member can move past the sealant inlet to block it or be retracted to open it. The sealant inlet 30 is provided with a threaded opening 46 to receive a threaded nozzle of the sealant gun in tight and sealed relationship to avoid any leakage through the fitting.

In order to provide a secondary seal, the flange clamp has packing seal grooves 48 and 50 positioned on both sides of the sealant cavity 40. The packing seal grooves 48 and 50 receive conventional packing to provide a secondary seal means for the pipe flanges on either sides of the joint.

A modified form of flange clamp is shown in FIGS. 9 through 11 and is identified by the reference numeral 52. In this modified form the hinges 26 may be deleted and the flange clamp is made in the form of three rings to provide for situations where the opposed pipe flanges are not the same size. In this modification, a main central ring 54 is employed having a slight inwardly tapering side wall configuration defined by the side walls 56 and 58. The main central ring 54 is identical in construction with the flange clamp of FIGS. 3 through 7 and is provided with the sealant cavity and fitting in the same fashion for which identical reference numerals are employed. The main ring 54 is bounded by a pair of side rings 60 and 62 on the opposed sides of the main ring. Each of these rings is provided with a packing seal groove 48 and 50 respectively as employed in the aforementioned flange clamp 20. The side rings 60 and 62 have flat inner sides to define tapering passages 64 and 66 between the rings and the central ring to receive sealant under pressure and form a seal therein.

The sealant gun 34 is best shown in FIGS. 1 and 2. As there shown, it has an elongated injector housing 70 which is internally threaded to receive an advancing screw 72. The advancing screw 72 is exterally threaded and has a polygonal end 74 such as in the form of a hexagon to conveniently receive a wrench for advancing the advancing screw under great pressure. The front end of the injector housing has a reduced portion 76 which is threaded to receive a union 78. The union in turn receives a further reduced nozzle 80 having a threaded extension 82 threadedly receivable within the threaded inlet opening 46 of the fitting.

USE

The use of the flange clamp assembly and sealant gun of this invention is simply effected. The flange clamp is conventionally made of steel but it will be understood that it may vary in its construction depending upon the temperature, pressure and corrosive application involved in the flange fittings and the fluid carried by the pipe.

In the fitting of the flange clamp assembly the packing seal grooves 48 and 50 are first filled with a conventional packing material such that the packing extends above the groove to provide a secondary seal when the assembly is fitted on the flanges. The assembly of the flange clamp 20 is best shown in FIGS. 6, 7, and 8. As there shown, the two main halves 22 and 24 are bolted together and with the jaws of the split ring assembly opened as shown, fitting around pipes 90 and 92 having flanges 94 and 96 as shown in FIG. 8 is effected. The opposite pair of the flanges of the flange clamp are then bolted together to firmly clamp the flange clamp assembly to the flanges 92 and 94 of the pipes.

After the initial assembly of the collar like flange clamp, the bolt valve 32 as best shown in FIG. 5 is withdrawn to open communication between the sealant inlet 30 and the main cavity passage 42. The sealant gun filled with sealant is then connected to the threaded opening 46 of the inlet fitting. The advancing screw 72 of the gun is then advanced to force sealant under high pressure into the clamp cavity 40. Continuing advancement of the advancing screw is effected until the cavity is filled which is evidenced by a slight extruding of the sealant from the clamp. When this has been effected, the bolt valve 32 is advanced to close the sealant inlet in the position shown in FIG. 5 blocking and closing the sealant fitting 30. It will be noted that in the valve closing operation additional pressure is effected by the advancing of the bolt valve so that no pressure is lost and as a matter of fact pressure is increased on the sealant in the valve closing operation. When the valve has been closed, the sealant gun is removed and the operation is completed. As shown in FIG. 3 the flange clamp assembly 20 has four inlet fittings and it will be understood that more or less can be employed as necessary for the particular type of operation desired. The operation is repeated for each of the sealant inlets as aforedescribed.

The modified flange clamp assembly 52 shown in FIGS. 9 through 11 is employed where one pipe flange is of a slightly different diameter than the mating pipe flange or when there are irregularities between one pipe flange and another making it difficult to fit an integral single clamp. The installation is similar to that described for the flange clamp assembly 20 and it will be understood that pivoted split ring halves using hinges 26 may likewise be used. The packing grooves 48 and 50 are filled with packing in a similar fashion to that previously described. In the assembly the main ring 54 is first installed to bridge the joint of the mating pipe flanges and the bolts 38 are tightened for the main ring halves to clamp the main ring over the joint. Then the two side rings 60 and 62 are similarly connected one on each side of the main ring over the separate pipe flanges. When the three rings have been connected and firmly clamped to the pipe flanges the introduction of the sealant to the main ring is effected in the same fashion as previously described. It will be understood that instead of a single sealant and valve fitting as shown in FIG. 9 that a plurality of such fittings may be used as will be well understood in the art.

Various changes and modifications may be made within this invention as will be readily apparent to those skilled in the art. Such modifications and changes are within the scope and teaching of this invention as defined by the claims appended hereto.

What is claimed is:

1. A flange clamp assembly for sealing the circumferential joint between a pair of mated pipe flanges, said clamp comprising a collar fitting around said flanges and having a shallow annular groove in registry with said joint, means for filling said groove with a fluid sealant under pressure comprising a fitting for a sealant gun, said fitting having a bifurcated passageway providing first and second passages opening to the atmosphere and a main passageway communicating with said annular groove, the first of said passages receiving the sealant gun and the second passage receiving a reciprocal valve member operable to open and close the main passage and said first passage, the second passage being axially aligned with the main passage and threaded to receive the reciprocal valve member, said valve member being threadedly receivable in said main passage to close the first passage and being reciprocable to open said first passage, said clamp being comprised of three axially aligned rings to accommodate mating flanges of different diameters, said rings comprising a first main ring provided with said annular groove engageable to bridge the joint between the flanges and second and third side rings engageable in clamping relation on the flanges on the opposite sides of the main ring.

2. The flange clamp of claim 1 in which the side walls of the main ring and the side rings are spaced from one another at their inside diameter and are closed together at their outside diameter to provide a circumferential passage bounding the flange for the reception of sealant extended under pressure from the annular groove.

3. The flange clamp of claim 1 in which the second and third side rings are provided at their inner face with circumferential grooves for the reception of a packing material to provide a secondary seal.

* * * * *